(12) United States Patent
Lee et al.

(10) Patent No.: US 10,128,531 B2
(45) Date of Patent: Nov. 13, 2018

(54) SOLID ELECTROLYTE PARTICLES, PREPARATION METHOD THEREOF, AND LITHIUM SECONDARY BATTERY COMPRISING THE SAME

(71) Applicants: LG CHEM, LTD., Seoul (KR); University-Industry Cooperation Group of Kyung Hee University, Yongin-si (KR)

(72) Inventors: Su Hee Lee, Daejeon (KR); Won Bae Byun, Daejeon (KR); Sang Hyuk Im, Yongin-si (KR); Cheol Hee Park, Daejeon (KR)

(73) Assignees: LG Chem, Ltd., Seoul (KR); University-Industry Cooperation Group of Kyung Hee University, Yongin-si, Gyeonggi-do (KR)

( * ) Notice: Subject to any disclaimer, the term of this patent is extended or adjusted under 35 U.S.C. 154(b) by 593 days.

(21) Appl. No.: 14/429,687

(22) PCT Filed: Oct. 24, 2014

(86) PCT No.: PCT/KR2014/010069
§ 371 (c)(1),
(2) Date: Mar. 19, 2015

(87) PCT Pub. No.: WO2015/060686
PCT Pub. Date: Apr. 30, 2015

(65) Prior Publication Data
US 2016/0020486 A1   Jan. 21, 2016

(30) Foreign Application Priority Data
Oct. 24, 2013  (KR) .......................... 10-2013-0127388

(51) Int. Cl.
  $H01M\ 10/0562$  (2010.01)
  $H01M\ 10/052$  (2010.01)
  $C01G\ 23/00$  (2006.01)

(52) U.S. Cl.
  CPC ...... H01M 10/0562 (2013.01); C01G 23/005 (2013.01); H01M 10/052 (2013.01);
  (Continued)

(58) Field of Classification Search
  CPC .......... H01M 10/0562; H01M 10/052; H01M 2300/0071; C01G 23/005; C01P 2002/34;
  (Continued)

(56) References Cited

U.S. PATENT DOCUMENTS 5,911,920 A * 6/1999 Hasezaki ........... C01G 45/1228
                                                    252/518.1
2010/0266486 A1* 10/2010 Put ..................... B82Y 30/00
                                                    423/598
(Continued)

FOREIGN PATENT DOCUMENTS

CN        1970455      *   5/2007
CN        1970455   A      5/2007
(Continued)

OTHER PUBLICATIONS

Sutorik et al., "The comparative influences of structural ordering, grain size, Li-content, and bulk density on the Li+-conductivity of Li0.29La0.57TiO3," Publish online Jun. 26, 2012, Journal of Materials Science, 47, 6992-7002 (Year: 2012).*
(Continued)

Primary Examiner — Ula C Ruddock
Assistant Examiner — Matthew W Van Oudenaren
(74) Attorney, Agent, or Firm — Dentons US LLP

(57) ABSTRACT

Provided are a method of preparing solid electrolyte particles of Chemical Formula 1 including preparing a precur-
(Continued)

sor solution by mixing a titanium precursor, a lanthanum precursor, and a lithium precursor in an aqueous or organic solvent, and heat treating the precursor solution, solid electrolyte particles prepared thereby, and a lithium secondary battery including the solid electrolyte particles:

$$Li_{3x}La_{(2/3-x)}TiO_3(0<x<0.16).  \quad \text{<Chemical Formula 1>}$$

According to a method of preparing solid electrolyte particles according to an embodiment of the present invention, solid electrolyte particles may be easily prepared by heat treating at low temperature for a short period of time.

10 Claims, 2 Drawing Sheets

(52) U.S. Cl.
CPC ...... *C01P 2002/34* (2013.01); *C01P 2002/72* (2013.01); *C01P 2004/03* (2013.01); *C01P 2004/64* (2013.01); *C01P 2006/12* (2013.01); *C01P 2006/40* (2013.01); *H01M 2300/0071* (2013.01); *Y02T 10/7011* (2013.01)

(58) Field of Classification Search
CPC .............. C01P 2002/72; C01P 2006/12; C01P 2006/40; C01P 2006/03; C01P 2004/64
See application file for complete search history.

(56) References Cited

U.S. PATENT DOCUMENTS

| | | | |
|---|---|---|---|
| 2011/0045355 A1* | 2/2011 | Ichikawa | H01M 4/043 429/231.95 |
| 2011/0318650 A1 | 12/2011 | Zhang et al. | |
| 2012/0237835 A1 | 9/2012 | Yada et al. | |
| 2013/0122376 A1 | 5/2013 | Yokoyama et al. | |
| 2014/0220436 A1 | 8/2014 | Yokoyama et al. | |

FOREIGN PATENT DOCUMENTS

| | | |
|---|---|---|
| JP | 11-79746 A | 3/1999 |
| JP | 2003-288954 A | 10/2003 |
| JP | 2003-346895 A | 12/2003 |
| JP | 2006-260887 A | 9/2006 |
| JP | 2008059843 A | 3/2008 |
| JP | 2011-119158 A | 6/2011 |
| JP | 2011529243 A | 12/2011 |
| JP | 2012-171803 A | 9/2012 |
| JP | 2014-026809 A | 2/2014 |
| JP | 2014-154237 A | 8/2014 |
| JP | 2015-088486 A | 5/2015 |
| WO | 2011/128976 A1 | 10/2011 |

OTHER PUBLICATIONS

Search Report of European Patent Office in Appl'n No. 14851409.4, dated Sep. 30, 2015.

Antoniassi, B. et al., "Microstructural and Electrochemical Study of La0.5Li0.5TiO3," May 16, 2011, Materials Chemistry and Physics, vol. 127, pp. 51-55.

Murugesan Vijayakumar et al: "Synthesis of Fine Powders of Li3xLa2/3-xTiO3 Perovsldte by a Polymerizable Precursor Method", Chemistry of Materials, vol. 16, No. 14, (Jul. 1, 2004), pp. 2719-2724, XP055214354.

Mei A et al: "Enhanced ionic transport in lithium lanthanum titanium oxide solid state electrolyte by introducing silica", Solid State Ionics, North Holland Pub. Company, Amsterdam; NL, vol. 179, No. 39, (Dec. 15, 2008), pp. 2255-2259, XP025716254.

Hongxia Geng et al: "Effect of sintering temperature on microstructure and transport properties of Li3xLa2/3-xTiO3 with different lithium contents", Electrochimica Acta, Elsevier Science Publishers, Barking, GB, vol. 56, No. 9, (Jun. 11, 2010), pp. 3406-3414, XP028371720.

* cited by examiner

SOLID ELECTROLYTE PARTICLES, PREPARATION METHOD THEREOF, AND LITHIUM SECONDARY BATTERY COMPRISING THE SAME

This application is a National Stage Entry of International Application No. PCT/KR2014/010069, filed on Oct. 24, 2014, which claims priority to and the benefit of Korean Patent Application No. 10-2013-0127388, filed on Oct. 24, 2013, all of which are hereby incorporated herein by reference in their entirety.

TECHNICAL FIELD

The present invention relates to solid electrolyte particles, a preparation method thereof, and a lithium secondary battery comprising the same, and more particularly, to solid electrolyte particles having a small, uniform average particle diameter and a chemical formula of $Li_{3x}La_{(2/3-x)}TiO_3$ (0<x<0.16), and a preparation method thereof.

BACKGROUND ART

The application area of chargeable and dischargeable secondary batteries is being increasingly expanded to electric vehicles as well as portable devices such as mobile phones, notebooks, and camcorders. Accordingly, secondary batteries have been actively developed. Also, research and development of battery design to improve capacity density and specific energy have been conducted during the development of the secondary batteries.

In general, it is known that battery safety improves in the order of a liquid electrolyte, a gel polymer electrolyte, and a solid polymer electrolyte, but battery performance decreases in the same order.

An electrolyte in a liquid state, particularly, an ion conductive organic liquid electrolyte, in which a salt is dissolved in a non-aqueous organic solvent, has been mainly used as an electrolyte for an electrochemical device, such as a typical battery using an electrochemical reaction and an electric double-layer capacitor. However, when the electrolyte in a liquid state is used, an electrode material may degrade and the organic solvent is likely to be volatilized. Also, there may be limitations in safety such as combustion due to ambient temperature and the temperature rise of the battery itself.

In particular, since an electrolyte used in a lithium secondary battery is in a liquid state and may have a risk of flammability in a high-temperature environment, this may impose a significant burden on electric vehicle applications. Since the above limitations may be addressed when the lithium electrolyte in a liquid state is replaced with a solid-state electrolyte, various conventional solid electrolytes have been researched and developed.

Among them, a perovskite-structure oxide having a chemical formula of $Li_{0.33}La_{0.66}TiO_3$ (LLTO) is a material having high chemical stability and durability as well as excellent lithium ion conductivity.

Typically, in order to synthesize LLTO, lithium precursor, lanthanum precursor, and titanium precursor powders are mixed and heat treated at a high temperature of 1,200° C. or more for a long period of time, and a LLTO solid electrolyte is then prepared through a grinding process. However, in this case, the high-temperature and prolonged heat treatment process may be uneconomical in terms of cost. Also, since the LLTO solid electrolyte having a particle diameter ranging from a few hundred nm to a few μm is prepared, the contact area between electrolyte particles and electrode particles may not only be limited but there may be limitations in reducing the thickness of an electrolyte layer.

Furthermore, in order to decrease the particle diameter of the LLTO solid electrolyte having a particle diameter of a few μm, a method of grinding the electrolyte has been performed. In this case, the particle diameter may be decreased by the grinding, but there is a limitation in obtaining a uniform particle diameter distribution.

DISCLOSURE OF THE INVENTION

Technical Problem

An aspect of the present invention provides a method of preparing solid electrolyte particles which may easily prepare solid electrolyte particles having an average particle diameter ($D_{50}$) of 100 nm or less at low temperature for a short period of time.

Another aspect of the present invention provides solid electrolyte particles which may increase a contact area with an active material due to an increase in specific surface area by having a small average particle diameter and a uniform particle diameter distribution when used in a lithium secondary battery and may thus facilitate the movement of lithium ions at an interface between an electrolyte and an electrode.

Another aspect of the present invention provides a lithium secondary battery including the solid electrolyte particles.

Technical Solution

According to an aspect of the present invention, there is provided a method of preparing solid electrolyte particles of Chemical Formula 1 including: preparing a precursor solution by mixing a titanium precursor, a lanthanum precursor, and a lithium precursor in an aqueous or organic solvent; and heat treating the precursor solution:

$$Li_{3x}La_{(2/3-x)}TiO_3 (0<x<0.16). \qquad \text{<Chemical Formula 1>}$$

According to another aspect of the present invention, there is provided solid electrolyte particles of Chemical Formula 1 having an average particle diameter ($D_{50}$) of 20 nm to 100 nm.

According to another aspect of the present invention, there is provided a lithium secondary battery including: a cathode containing a cathode active material layer; an anode containing an anode active material layer; and a solid electrolyte layer disposed between the cathode and the anode, wherein the solid electrolyte layer includes the solid electrolyte particles of Chemical Formula 1.

Advantageous Effects

According to a preparation method according to an embodiment of the present invention, since a titanium precursor including titanium oxide particles having a diameter of 10 nm or less is used, solid electrolyte particles may be easily prepared at low temperature for a short period of time.

Also, since the solid electrolyte particles according to an embodiment of the present invention may have an average particle diameter of 100 nm or less and a uniform particle diameter distribution, a contact area with an active material may be easily increased during processing when used in a lithium secondary battery, and this may be favorable conditions for charge and discharge by increasing the movement paths of lithium ions. Thus, the performance characteristics of the lithium secondary battery may be further improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

Figure 1:
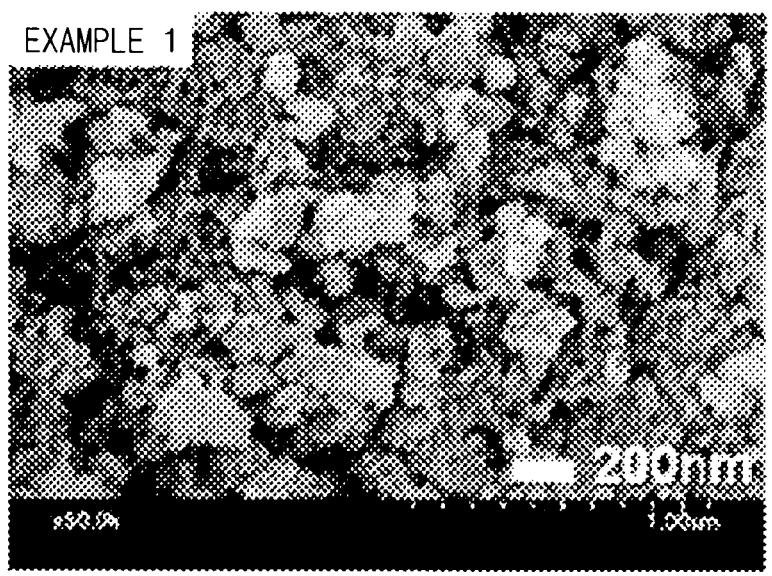
FIG. 1 is a scanning electron microscope (SEM) image of solid electrolyte particles prepared in Example 1.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing solid electrolyte particles of the following Chemical Formula 1 (LLTO) according to an embodiment of the present invention may include preparing a precursor solution by mixing a titanium precursor, a lanthanum precursor, and a lithium precursor in an aqueous or organic solvent; and heat treating the precursor solution:

$\text{Li}_{3x}\text{La}_{(2/3-x)}\text{TiO}_3$ ($0<x<0.16$).          <Chemical Formula 1>

The titanium precursor may include titanium oxide particles having an average particle diameter ($D_{50}$) of 0.5 nm to 10 nm, preferably, 0.5 nm to 5 nm, more preferably, 0.5 nm to 3 nm.

According to the method of preparing solid electrolyte particles according to the embodiment of the present invention, since the titanium precursor including titanium oxide particles having the above average particle diameter is used, solid electrolyte particles may be easily prepared at low temperature for a short period of time. In addition, since the titanium precursor including titanium oxide particles having the above average particle diameter is used, solid electrolyte particles of Chemical Formula 1 having an average particle diameter of 100 nm or less and a uniform particle diameter distribution may be obtained.

Specifically, the method of preparing solid electrolyte particles of Chemical Formula 1 according to the embodiment of the present invention may include preparing a precursor solution by mixing a titanium precursor, a lanthanum precursor, and a lithium precursor in an aqueous or organic solvent (step (i)).

Titanium oxide powder including titanium oxide particles having an average particle diameter ($D_{50}$) of 0.5 nm to 10 nm may be used or a titanium oxide colloidal solution may be used as the titanium precursor usable according to an embodiment of the present invention.

The titanium oxide colloidal solution may be prepared by a method typically used in the art or a commercialized titanium oxide colloidal solution may be used, but the present invention is not limited thereto.

In the case that the titanium oxide colloidal solution is used, titanium alkoxide and a stabilizer, for example, are sequentially added to alcohol to be dissolved and reacted. Then, distilled water and a basic solution are added thereto, and a titanium oxide colloidal solution may be obtained by the neutralization reaction of the mixed solution.

According to an embodiment of the present invention, the titanium precursor may be used in an amount of 30 wt % to 50 wt % based on a total weight of the precursor solution.

Also, the lanthanum precursor usable according to an embodiment of the present invention may include any one selected from the group consisting of alkoxides, chlorides, oxides, hydroxides, oxyhydroxides, nitrates, carbonates, acetates, and oxalates which include lanthanum, or a mixture of two or more thereof. Specifically, the lanthanum precursor may include any one selected from the group consisting of lanthanum nitrate hexahydrate ($\text{La(NO}_3\text{)}_3 \cdot 6\text{H}_2\text{O}$), lanthanum carbonate ($\text{La}_2(\text{CO}_3)_3$), and lanthanum oxide ($\text{La}_2\text{O}_3$), or a mixture of two or more thereof.

The lanthanum precursor may be used in an amount of 40 wt % to 80 wt % based on a total weight of the precursor mixture.

Also, the lithium precursor usable according to an embodiment of the present invention may include any one selected from the group consisting of lithium chloride (LiCl), lithium carbonate ($\text{Li}_2\text{CO}_3$), lithium hydroxide (LiOH), lithium phosphate ($\text{Li}_3\text{PO}_4$), and lithium nitrate ($\text{LiNO}_3$), or a mixture of two or more thereof.

The lithium precursor may be used in an amount of 5 wt % to 10 wt % based on the total weight of the precursor mixture.

The organic solvent may include ketones such as acetone or methylethylketone; ethers such as tetrahydrofuran; alcohols such as methanol, ethanol, propanol, isopropanol, or butanol; esters such as ethyl acetate; or halogenated hydrocarbons such as dichloromethane and chlorobenzene.

The mixing of the titanium precursor, lanthanum precursor, and lithium precursor in an aqueous or organic solvent may use mechanical milling to uniformly mix and prepare solid electrolyte particles having a uniform particle diameter distribution. The mechanical milling, for example, may be performed by using a roll mill, ball mill, or jet mill. The mixing may be performed for 1 hour to 8 hours, for example, 1 hour to 6 hours.

Also, the method of preparing solid electrolyte particles of Chemical Formula 1 according to the embodiment of the present invention may include heat treating the precursor solution (step (ii)).

The heat treatment, for example, may be performed by using an electric furnace in a temperature range of 700° C. to 1,000° C. and holding for about 1 minute to about 60 minutes, specifically, 1 minute to 30 minutes, for example, 1 minute to 10 minutes.

The average particle diameter of the solid electrolyte particles of the present invention may be controlled according to the heat treatment temperature and holding time.

In the case that the heat treatment temperature is less than 700° C., the preparation of the solid electrolyte particles of Chemical Formula 1 itself may be difficult. In the case in which the heat treatment temperature is greater than 1,000° C., the particle diameter of the solid electrolyte particles may increase and, as a result, the ionic conductivity and performance characteristics of the secondary battery may degrade.

Also, according to an embodiment of the present invention, in the electric furnace, a heating rate to the above temperature range, for example, may be in a range of 30° C./min to 100° C./min, and it is desirable to perform fast quenching after holding for about 1 minute to about 30 minutes at a temperature of 700° C. to 1,000° C.

Typically, in order to prepare the solid electrolyte particles of Chemical Formula 1, a heat treatment was performed at a high temperature of 1,200° C. or more for a long period of time to obtain solid electrolyte particles having an average particle diameter ranging from a few hundred nm to a few tens μm. In order to obtain solid electrolyte particles having an average particle diameter of a few tens of nanometers from the above solid electrolyte particles having a large average particle diameter, the solid electrolyte particles having a large average particle diameter are ground and used. The average particle diameter may be decreased by the grinding process, but there is a limitation in obtaining a uniform particle diameter distribution having an average particle diameter of less than 100 nm.

However, according to the method of preparing solid electrolyte particles according to the embodiment of the present invention, since a titanium precursor including titanium oxide particle having an average particle diameter of 10 nm or less is used and a low-temperature heat treatment is performed, solid electrolyte particles having an average particle diameter ($D_{50}$) of 20 nm to 100 nm and a uniform particle diameter distribution may be obtained.

That is, the solid electrolyte particles according to the embodiment of the present invention may have a perovskite structure of Chemical Formula 1 having an average particle diameter ($D_{50}$) of 20 nm to 100 nm, for example, 20 nm to 50 nm.

In the case that the average particle diameter is less than 20 nm, a process of preparing solid electrolyte particles having a diameter of less than the above average particle diameter itself may be difficult. In the case in which the average particle diameter is greater than 100 nm, since an increase in the contact area between the electrode and the electrolyte due to the increase in the specific surface area may not be sufficient, the movement of lithium ions at the interface may not be easy.

In the present invention, the average particle diameter ($D_{50}$), for example, may be measured by using a laser diffraction method or scanning electron microscope (SEM) image. The laser diffraction method may generally measure a particle diameter ranging from a submicron level to a few mm, and may obtain highly repeatable and high resolution results. The average particle diameter ($D_{50}$) of the solid electrolyte particles may be defined as a particle diameter at 50% in a cumulative particle diameter distribution.

The solid electrolyte particles according to the embodiment of the present invention may have a very uniform particle size distribution, and for example, a ratio of the amount of the solid electrolyte particles having an average particle diameter satisfying 20 nm≤$D_{50}$≤40 nm to a total weight of the solid electrolyte particles may be in a range of 40 wt % to 60 wt %.

The average particle diameter of the solid electrolyte particles of Chemical Formula 1 according to the embodiment of the present invention may be controlled according to the types and sizes of the precursors used and the reaction time and temperature.

The solid electrolyte particles according to the embodiment of the present invention may have a single phase. That is, in a graph illustrating the data obtained by X-ray diffraction (XRD) analysis of the solid electrolyte particles according to the embodiment of the present invention, for example, a second phase, such as $La_2Ti_2O_7$ or $Li_2TiO_3$, is not present and a single phase of LLTO may be observed.

Figure 3:
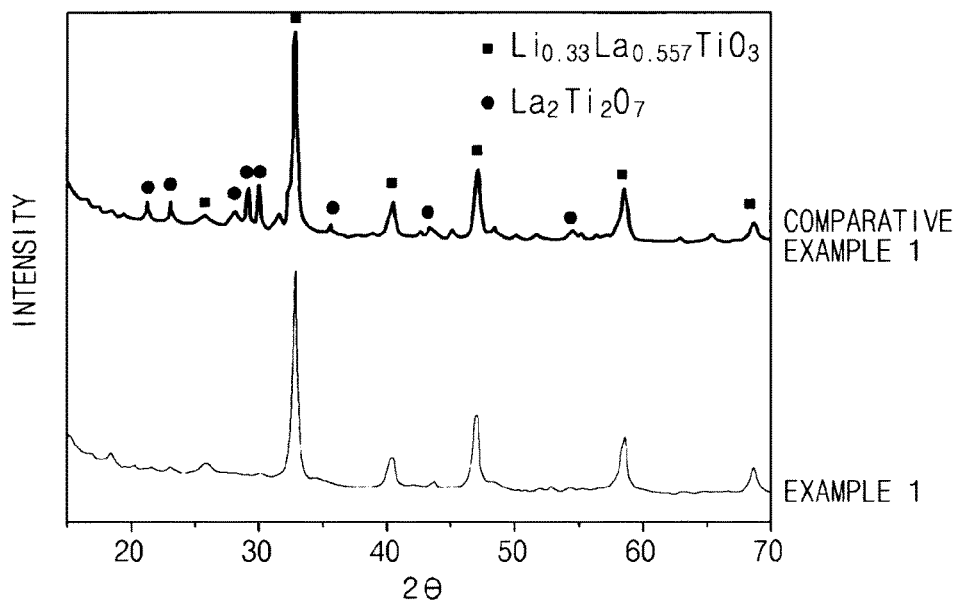
FIG. 3 is a graph illustrating the results of X-ray diffraction (XRD) analysis of solid electrolyte particles prepared in Example 1 and Comparative Example 1.

Specifically, in the graph illustrating the data obtained by X-ray diffraction (XRD) analysis of the solid electrolyte particles according to the embodiment of the present invention, main peaks of $La_2Ti_2O_7$ or $Li_2TiO_3$ may not be almost observed in the XRD data as in FIG. 3.

The solid electrolyte particles according to the embodiment of the present invention may include impurities (second phase) in an amount of 2 wt % or less based on the total weight of the solid electrolyte particles.

A mixed amount of the $La_2Ti_2O_7$ and $Li_2TiO_3$ impurities may be about 2 wt % or less based on the total weight of the solid electrolyte particles, and specifically, an amount of each of the $La_2Ti_2O_7$ and $Li_2TiO_3$ may be about 1 wt % or less. For example, the amount of the $La_2Ti_2O_7$ may be 1 wt % or less, and the amount of the $Li_2TiO_3$ may be about 1 wt % or less, about 0.5 wt % or less, or about 0 wt %.

Since the solid electrolyte particles according to the embodiment of the present invention may include second phases, $La_2Ti_2O_7$ and $Li_2TiO_3$, respectively in an amount of 1 wt % or less, the purity of LLTO is very high and the ionic conductivity may be significantly improved.

The solid electrolyte particles according to the embodiment of the present invention may have an ionic conductivity (S/cm) of $9.0 \times 10^{-4}$ S/cm to $4.0 \times 10^{-3}$ S/cm, specifically, $1.0 \times 10^{-3}$ S/cm to $4.0 \times 10^{-3}$ S/cm, for example, $2.0 \times 10^{-3}$ S/cm to $4.0 \times 10^{-3}$ S/cm, when measured at room temperature.

Also, the present invention may provide a lithium secondary battery including a cathode containing a cathode active material layer, an anode containing an anode active material layer, and a solid electrolyte layer disposed between the cathode and the anode, wherein the solid electrolyte layer includes the solid electrolyte particles of Chemical Formula 1.

According to an embodiment of the present invention, a specific surface area of the solid electrolyte particles constituting the solid electrolyte layer may be in a range of 200 $m^2/g$ to 400 $m^2/g$.

According to an embodiment of the present invention, the specific surface area of the solid electrolyte particles may be measured by a Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

Since the lithium secondary battery uses the solid electrolyte particles having improved ionic conductivity, the lithium secondary battery may have excellent charge and discharge characteristics, such as the increase in capacity and the improvement in lifetime characteristics, when the solid electrolyte particles are used as a solid electrolyte in the secondary battery. In particular, since the average particle diameter is small and the particle diameter distribution is uniform, the contact area with the active material may be easily increased during lithium secondary battery processing. Accordingly, this may be favorable conditions for charge and discharge by increasing the movement paths of ions.

The solid electrolyte layer may be formed by a method typically used in the art. For example, the solid electrolyte particles are mixed with a binder and an organic solvent to prepare the mixture in the form of a thick film by coating or screen printing the mixture on a substrate. Then, the substrate is removed to prepare a solid electrolyte layer.

A thickness of the solid electrolyte layer may be in a range of 10 μm to 20 μm.

According to an embodiment of the present invention, since the solid electrolyte layer includes solid electrolyte particles having a small average particle diameter, the solid electrolyte layer may be obtained in which the thickness thereof is decreased by 30% to 50% in comparison to that of a typical solid electrolyte layer.

An electrode of the lithium secondary battery of the present invention may be prepared by a typical method known in the art. For example, a binder, a conductive agent, and a dispersant, if necessary, as well as a solvent are mixed with an electrode active material and stirred to prepare a slurry, and a metal current collector is then coated with the slurry and pressed. Thereafter, the electrode may be prepared by drying the metal current collector.

A cathode active material or an anode active material may be used as the electrode active material.

The cathode active material, for example, may include any one selected from the group consisting of $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2(0 \leq y \leq 1)$, $Li(Ni_aCo_bMn_c)O_4(0<a<2, 0<b<2, 0<c<2,$ and $a+b+c=2)$, $LiMn_{2-z}Ni_zO_4$, $LiMn_{2-z}Co_zO_4$ $(0<z<2)$, $LiCoPO_4$ and $LiFePO_4$, or a mixture of two or more thereof. However, the present invention is not limited thereto. Also, sulfide, selenide, and halide may be included in addition to the above oxides.

A carbon material, lithium metal, silicon, or tin, which may intercalate and deintercalate lithium ions, may be typically used as an anode active material. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

A slurry is prepared by mixing and stirring the cathode or anode active material, a binder, a solvent, and a conductive agent and a dispersant which may be typically used if necessary. Then, the cathode or anode may be prepared by coating a current collector with the slurry and pressing the coated current collector.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

<Preparation of $Li_{0.33}La_{0.557}TiO_3$ Solid Electrolyte Particles>

Example 1

87.14 ml of an aqueous $TiO_2$ colloidal solution which includes $TiO_2$ having an average particle diameter of about 3 nm in a solid content concentration of about 50 mg/ml, 4.997 g of $La_2O_3$, and 0.665 g of $Li_2CO_3$ were added to 200 ml of ethanol. Then, in order to mix them as uniformly as possible, the above materials were mixed using a ball mill for 6 hours to prepare a precursor solution. The precursor solution was dried at 100° C. to entirely remove a liquid therefrom and then put in an aluminum crucible to be introduced into an electric furnace. The temperature was increased to 850° C. at a heating rate of 50° C./min and was then held for 10 minutes (reaction time) while the temperature was maintained at 850° C. Thereafter, the temperature was quickly decreased to room temperature at a cooling rate of 50° C./min to obtain $Li_{0.33}La_{0.557}TiO_3$ solid electrolyte particles.

Example 2

$Li_{0.33}La_{0.557}TiO_3$ solid electrolyte particles were obtained in the same manner as in Example 1 except that the reaction time was 30 minutes in Example 1.

Example 3

$Li_{0.33}La_{0.557}TiO_3$ solid electrolyte particles were obtained in the same manner as in Example 1 except that LiOH was used instead of $Li_2CO_3$ in Example 1.

Comparative Example 1

$Li_{0.33}La_{0.55}7TiO_3$ solid electrolyte particles were obtained in the same manner as in Example 1 except that an aqueous $TiO_2$ colloidal solution which included $TiO_2$ having an average particle diameter of 15 nm was used.

Comparative Example 2

$Li_{0.33}La_{0.55}7TiO_3$ solid electrolyte particles were obtained in the same manner as in Example 1 except that an aqueous $TiO_2$ colloidal solution which included $TiO_2$ having an average particle diameter of 100 nm was used.

Average particle diameters and particle diameter distributions of solid electrolyte particles prepared in Example 1 and Comparative Examples 1 and 2 are presented in Table 1 below.

TABLE 1

| | Average particle diameter ($D_{50}$) of $Li_{0.33}La_{0.557}TiO_3$ | Amount (wt %) satisfying 20 nm ≤ $D_{50}$ ≤ 40 nm |
|---|---|---|
| Example 1 | 30 nm | 60 |
| Comparative Example 1 | 150 nm | 10 |
| Comparative Example 2 | 2 μm | 3 |

<Preparation of Solid Electrolyte Layer>

Example 4

The $Li_{0.33}La_{0.557}TiO_3$ solid electrolyte particles obtained in Example 1 and a binder solution, in which ethyl cellulose was dissolved in butyl carbitol, were mixed with terpineol, and the mixture was then screen printed on a glass substrate deposited with indium tin oxide (ITO). After the printed glass substrate was sufficiently dried at 220° C., the binder was thermally removed at 450° C. to obtain a solid electrolyte layer.

Examples 5 and 6

Solid electrolyte layers were obtained in the same manner as in Example 4 except that the $Li_{0.33}La_{0.557}TiO_3$ solid electrolyte particles obtained in Examples 2 and 3 were respectively used.

Comparative Examples 3 and 4

Solid electrolyte layers were obtained in the same manner as in Example 4 except that the $Li_{0.33}La_{0.557}TiO_3$ solid electrolyte particles obtained in Comparative Examples 1 and 2 were respectively used.

Experimental Example 1

Scanning Electron Microscope (SEM) Analysis

Figure 2:
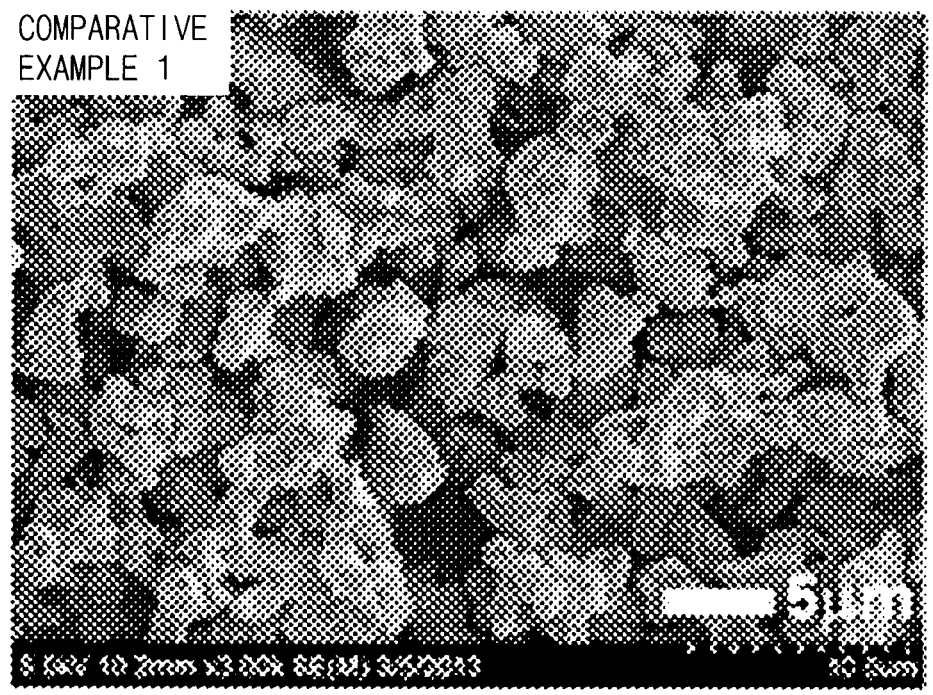
FIG. 2 is an SEM image of solid electrolyte particles prepared in Comparative Example 1.

SEM images were obtained from the $Li_{0.33}La_{0.557}TiO_3$ solid electrolyte particles obtained in Example 1 and Comparative Example 1, and the results thereof are presented in FIGS. 1 and 2, respectively.

Referring to FIG. 1, it may be confirmed that an average particle diameter of the $Li_{0.33}La_{0.557}TiO_3$ solid electrolyte particles prepared in Example 1 was 100 nm or less and the diameter of the particles was very uniform.

In contrast, referring to FIG. 2, an average particle diameter of the $Li_{0.33}La_{0.557}TiO_3$ solid electrolyte particles prepared in Comparative Example 1 was greater than 1 μm, and it may be visually confirmed that the variation in the diameter of each particle was relatively greater than that of Example 1.

Thus, as illustrated in FIGS. 1 and 2, since solid electrolyte particles may be synthesized even at a low temperature of 1,000° C. or less by using a titanium precursor which includes $TiO_2$ particles having an average particle diameter of 3 nm and the $Li_{0.22}La_{0.557}TiO_3$ solid electrolyte particles obtained by the above method also had a uniform average particle diameter, it may be estimated that a uniform solid electrolyte layer may be obtained.

Also, the variation in the average particle diameter of the solid electrolyte particles according to reaction conditions is presented in Table 2 below.

TABLE 2

| Examples | Precursor | Heat treatment temperature (° C.) | Reaction time (min) | Average particle diameter (nm) |
|---|---|---|---|---|
| Example 1 | 3 nm $TiO_2$, $La_2O_3$, $Li_2CO_3$ | 850 | 10 | 30 |
| Example 2 | 3 nm $TiO_2$, $La_2O_3$, $Li_2CO_3$ | 850 | 30 | 50 |
| Example 3 | 3 nm $TiO_2$, $La_2O_3$, LiOH | 850 | 10 | 40 |
| Comparative Example 1 | 15 nm $TiO_2$, $La_2O_3$, $Li_2CO_3$ | 850 | 10 | 150 |
| Comparative Example 2 | 100 nm $TiO_2$, $La_2O_3$, $Li_2CO_3$ | 850 | 10 | 2,000 |

As illustrated in Table 2, it may be understood that the average particle diameter of the $Li_{0.33}La_{0.557}TiO_3$ solid electrolyte particles was changed according to the type of precursor and the reaction time.

Specifically, with respect to the solid electrolyte particles using about 3 nm $TiO_2$ as in Examples 1 to 3, the average particle diameters were 50 nm or less.

In contrast, with respect to the solid electrolyte particles using about 15 nm $TiO_2$ as in Comparative Example 1, the average particle diameter was 150 nm, and with respect to the solid electrolyte particles of Comparative Example 2 using about 100 nm $TiO_2$, the average particle diameter was 2,000 nm.

In addition, referring to Examples 1 and 3, it was observed that there was a difference in the average particle diameter of the solid electrolyte particles according to the type of lithium precursor, i.e., the use of $Li_2CO_3$ and LiOH. That is, with respect to Example 1 using $Li_2CO_3$ as a lithium precursor, the difference in the average particle diameter between Example 1 and Example 3 using LiOH was about 30%.

Also, referring to Examples 1 and 2, it was observed that there was a difference in the average particle diameter of the solid electrolyte particles according to the reaction time. That is, with respect to Example 1 in which the reaction time at 850° C. was 10 minutes, the difference in the average particle diameter between Example 1 and Example 2, in which the reaction time was 30 minutes, was about 60%.

Thus, according to the present invention, it may be understood that the average particle diameter of the solid electrolyte particles may be controlled according to the diameter of the titanium precursor, the type of lithium precursor, and the reaction time as illustrated in Table 2.

Experimental Example 2

X-Ray Diffraction (XRD) Analysis

XRD analysis was performed on the solid electrolyte particles prepared in Example 1 and Comparative Example 1 according to the present invention to identify crystallinity. The results thereof are presented in FIG. 3.
  target: Cu(Kα-line) graphite monochromator
  slit: divergence slit=0.5 degree, receiving slit=9.55 mm, scattering slit=5.89 degree
  measurement range and step angle/measurement time: 10.0°<2θ<90°, 0.024°/0.5 seconds, where "2θ" represents a diffraction angle.

As illustrated in FIG. 3, it may be understood that the solid electrolyte particles of Example 1 only exhibited a $Li_{0.33}La_{0.557}TiO_3$ crystalline phase, but a $La_2Ti_2O_7$ second phase as well as $Li_{0.33}La_{0.557}TiO_3$ were present in the solid electrolyte particles of Comparative Example 1. That is, a $Li_{0.33}La_{0.557}TiO_3$ single phase may be synthesized at a low temperature of 1,000° C. or less by using the precursor formed of $TiO_2$ having an average particle diameter of about 2 nm to about 3 nm.

Experimental Example 3

Ratio of Second Phase and Ionic Conductivity

The results of the analysis of the amount of the second phase by XRD analysis and the results of ionic conductivity measurements of the solid electrolyte particles prepared in Examples 1 to 3 and Comparative Examples 1 and 2 according to the present invention are presented in Table 3 below.

The ionic conductivity measurement in Experimental Example 3 was performed as follows:

The solid electrolyte particle powders of Examples 1 to 3 and Comparative Examples 1 and 2 were put in a stainless steel mold and pressed to prepare pellets, and the pellets were then heat treated at about 1,250° C. for 12 hours using an electric furnace to fabricate sintered bodies. A diameter of the fabricated sintered bodies was 16 mm, and each cell was completed by depositing gold (Au) on the top and the bottom of the solid electrolyte to a thickness of 100 nm using a hard mask at 100 W in an argon (Ar) atmosphere. Ionic conductivity at 25° C. was measured from responses which were obtained by applying alternating current to each cell placed between two blocking electrodes using an impedance analyzer (IM6, Zahner).

TABLE 3

| Examples | LLTO $Li_{0.33}La_{0.557}TiO_3$ | Impurities (Second phase) $La_2Ti_2O_7$ | $Li_2TiO_3$ | Ionic conductivity (S/cm) |
|---|---|---|---|---|
| Example 1 | 98.5 wt % | 1 wt % | 0.5 wt % | $3.2 \times 10^{-3}$ |
| Example 2 | 99 wt % | 1 wt % | 0 wt % | $2.3 \times 10^{-3}$ |
| Example 3 | 98 wt % | 1 wt % | 1 wt % | $2.9 \times 10^{-3}$ |
| Comparative Example 1 | 87 wt % | 12 wt % | 1 wt % | $1.2 \times 10^{-4}$ |
| Comparative Example 2 | 82 wt % | 17 wt % | 1 wt % | $4.3 \times 10^{-4}$ |

As illustrated in Table 3, it may be understood that the amount of the LLTO prepared in Examples 1 to 3 which were prepared by using a titanium precursor having an average particle diameter of 10 nm or less according to the embodiment of the present invention was 98 wt % or more based on the total weight of the solid electrolyte particles, and the amount of each of the $La_2Ti_2O_7$ and $Li_2TiO_3$ impurities (second phases) was 1 wt % or less.

In contrast, with respect to Comparative Examples 1 and 2 which were prepared respectively using titanium precursors having a large average particle diameter, it may be understood that the amount of each of the $La_2Ti_2O_7$ and $Li_2TiO_3$ impurities (second phases) was increased by 10 times or more in comparison to that of Examples 1 to 3. Also, in the case that a large amount of impurities (second phases) was generated to reduce the purity of LLTO as in Comparative Examples 1 and 2, it may be understood that the ionic conductivity of the solid electrolyte was decreased.

Specifically, with respect to the solid electrolyte particles including 98 wt % or more of LLTO as in Examples 1 to 3, the ionic conductivity was $2.3 \times 10^{-3}$ or more. In contrast, in the case that the purity of LLTO was low due to the generation of a large amount of impurities (second phases) as in Comparative Examples 1 and 2, the ionic conductivity was $1.2 \times 10^{-4}$ or more.

The invention claimed is:

1. A method of preparing solid electrolyte particles of Chemical Formula 1, the method comprising:
   preparing a precursor solution by mixing a titanium precursor, a lanthanum precursor, and a lithium precursor in an aqueous or organic solvent; and
   heat treating the precursor solution to obtain the solid electrolyte particles,
   wherein the titanium precursor comprises titanium oxide particles having an average particle diameter of 0.5 nm to 10 nm, and
   wherein the solid electrolyte particles have an average particle diameter ($D_{50}$), which is a particle diameter at 50% in a cumulative particle diameter distribution, of 20 nm to 100 nm:

$Li_{3x}La_{(2/3-x)}TiO_3$ (0<x<0.16)          <Chemical Formula 1>.

2. The method of claim 1, wherein the average particle diameter of the titanium oxide particles is in a range of 0.5 nm to 5 nm.

3. The method of claim 1, wherein the titanium precursor is titanium oxide powder or a titanium oxide colloidal solution.

4. The method of claim 1, wherein the heat treatment is performed in a temperature range of 700° C. to 1,000° C.

5. The method of claim 4, wherein the heat treatment is performed for 1 minute to 60 minutes.

6. The method of claim 5, wherein the heat treatment is performed for 1 minute to 10 minutes.

7. The method of claim 1, wherein the mixing is performed by using a roll mill, a ball mill, or a jet mill.

8. The method of claim 7, wherein the mixing is performed for 1 hour to 8 hours.

9. The method of claim 1, wherein the lanthanum precursor comprises any one selected from the group consisting of alkoxides, chlorides, oxides, hydroxides, oxyhydroxides, nitrates, carbonates, acetates, and oxalates which include lanthanum, or a mixture of two or more thereof.

10. The method of claim 1, wherein the lithium precursor comprises any one selected from the group consisting of lithium chloride (LiCl), lithium carbonate ($Li_2CO_3$), lithium hydroxide (LiOH), lithium phosphate ($Li_3PO_4$), and lithium nitrate ($LiNO_3$), or a mixture of two or more thereof.

* * * * *